Figure 1:
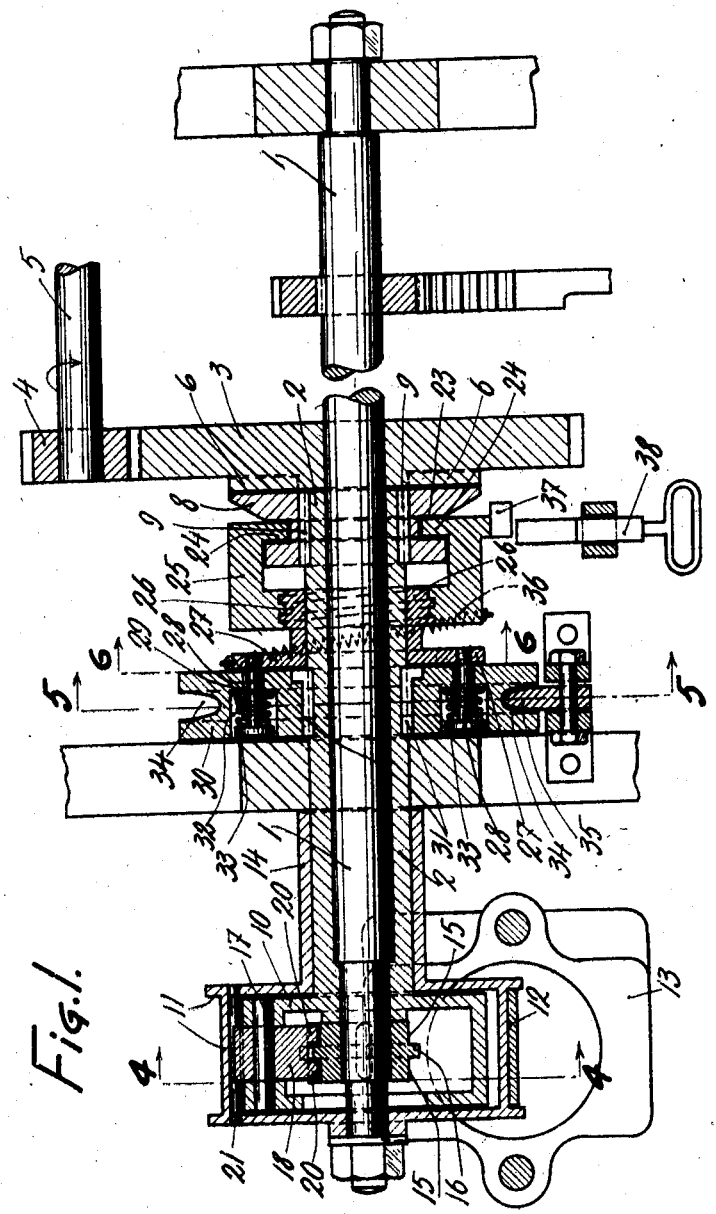

Feb. 19, 1929.  1,702,720

E. H. CARLSSON

MACHINE FOR RAMMING PAVING STONES OR THE LIKE

Filed Sept. 22, 1926   3 Sheets-Sheet 1

ERNST HJALMAR CARLSSON
INVENTOR;

By his Attorney.

Feb. 19, 1929.  E. H. CARLSSON  1,702,720
MACHINE FOR RAMMING PAVING STONES OR THE LIKE
Filed Sept. 22, 1926   3 Sheets-Sheet 2
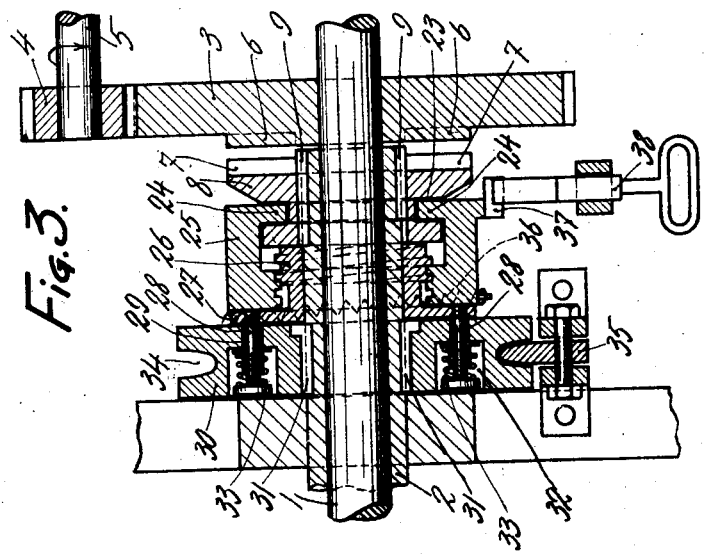
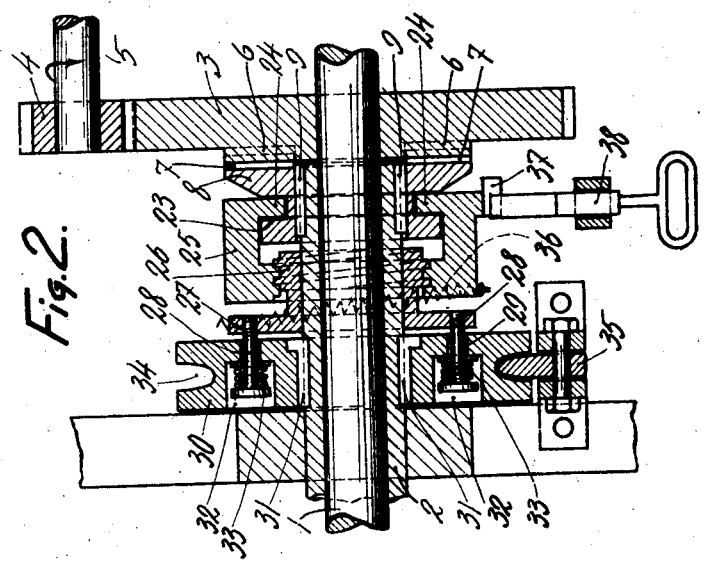
ERNST HJALMAR CARLSSON
INVENTOR;
By
Attorney.

Feb. 19, 1929.　　　　　E. H. CARLSSON　　　　　1,702,720
MACHINE FOR RAMMING PAVING STONES OR THE LIKE
Filed Sept. 22, 1926　　　3 Sheets-Sheet 3
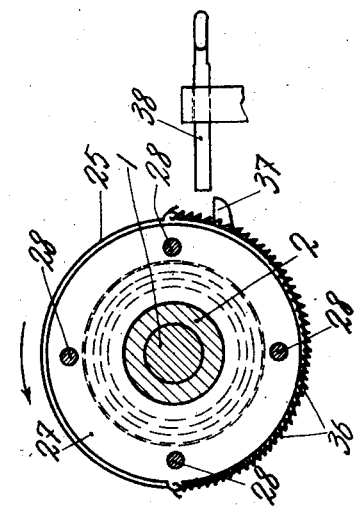
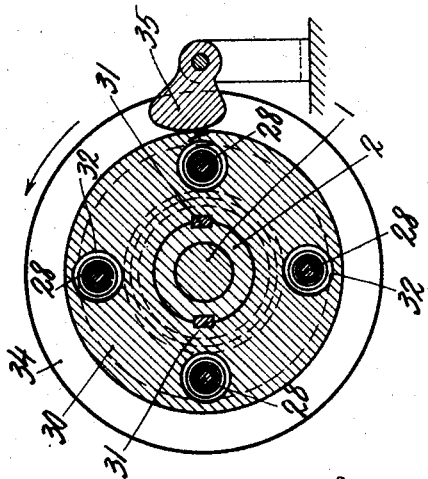
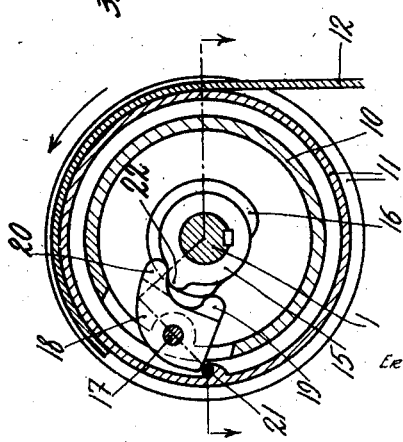
ERNST HJALMAR CARLSSON.
INVENTOR Patented Feb. 19, 1929.

1,702,720

UNITED STATES PATENT OFFICE.

ERNST HJALMAR CARLSSON, OF OSCARSHAMN, SWEDEN.

MACHINE FOR RAMMING PAVING STONES OR THE LIKE.

Application filed September 22, 1926, Serial No. 137,022, and in Sweden August 28, 1926.

This invention relates to a device in such machines as are used for ramming paving stones or the like working with a movable rammer joined with a driving mechanism in such a way, that it is lifted up and thereafter is free to fall down. The invention relates to a device for disconnecting the driving source (a motor on the machine) and keeping the rammer in suspended position when it for some reason need not work.

In the accompanying drawings is shown a suitable embodiment of the invention. Figure 1 is a horizontal section through the machine with the parts in the position they assume when the motor is coupled in. Figures 2 and 3 are similar horizontal sections through the decoupling device, Figure 2 showing the coupling device partly disengaged and Figure 3 showing the same wholly disengaged. Figure 4 is a vertical section on the line 4—4 in Figure 1. Figure 5 is a vertical section on the line 5—5 in Figure 1. Figure 6 is a vertical section on the line 6—6 in Figure 1.

In a frame a turnable and lockable shaft 1 is arranged, on which shaft a member in the form of a sleeve 2 is rotatably mounted, one end of which by a coupling mechanism is joined with a toothed wheel 3 rotating on the shaft 1, the said toothed wheel 3 being driven by a smaller toothed wheel 4 fastened to the shaft 5 of a motor, not shown in the drawing. The coupling mechanism between the sleeve 2 and the toothed wheel 3 consists of an ordinary clutch coupling, one coupling half of which is formed by the toothed wheel 3 which for this purpose is provided with shoulders 6, intended to cooperate with shoulders 7 (Figures 2 and 3) on the other coupling half 8. The latter is by means of splines 9 slidably but not rotatably arranged on the rotatable sleeve 2, so that the shoulders 6 and 7 can be brought either into or out of engagement with each other for connecting or disconnecting the source of power.

The sleeve 2 at its other end is integral with a drum or the like 10, Figures 1 and 4, surrounded by another drum 11 joined with a belt or other flexible member 12 in which the ramming head 13 (Figure 1) is suspended. The drum 11 is provided with a hub 14 rotatable on the sleeve 2. A sleeve situated inside the drum 10 is jammed on the shaft 1, which sleeve is provided with two similar cams 15, and a third cam 16, located between the two first mentioned cams, Figures 1 and 4. In the drum 10, a pin 17 is fastened, upon which a coupling hook 18 is swingably journalled and provided with a shoulder 19, situated opposite to and cooperating with the cam 16, and with two other shoulders 20 placed opposite to and coacting with the cams 15, Figures 1 and 4. There is a pin, a shoulder or the like 21 in the outer drum 11.

According to Figure 1 the clutch coupling between the toothed wheel 3 and the sleeve 2 is thrown in. When the sleeve 2 rotates, driven by the toothed wheels 3 and 4, the coupling hook 18 in the inner drum is swung by means of the stationary cams 15, 16 into and out of contact position for the pin 21 on the outer drum 11. When the hook 18 hits the pin 21, the drum 11 is coupled with the drum 10 associated with the sleeve 2, so that upon rotation of the sleeve the outer drum 11 together with the inner drum 10 is rotated in the direction of the arrow, Figure 4, until the coupling hook, when the shoulders 20 pass the protruding cam parts 22, Figure 4, is swung out of contact with the pin 21. The drum 11 is then turned back to its original position through the action of the freely falling ramming head, and the coupling hook is swung again into contact position for the pin 21, whereafter the course is repeated.

Rotary adjustment of the shaft 1 serves the purpose of regulating the ramming action of the device by altering the stroke of the ramming head. Accordingly as the adjustment of the shaft 1 is made, the relative positions of the cams 15, 16 and 22 are changed, and as a consequence the high points of the cams engage the coupling hook 18 either earlier or later, as the case may be, thereby causing a greater or less amount of belting 12 to be taken up or released by the drum 11 before the two drums 10 and 11 are again disengaged from each other to drop the ramming head.

In order that one may be able to decouple the motor and hold the ramming head suspended temporarily, the following arrangement is now made.

The slidable coupling half 8 is provided with an outer ring-shaped depression 23, Figures 1 to 3, into which extends a flange 24 on a nut 25 concentric with the coupling half 8 and located on a left threaded screw 26, loosely mounted on the sleeve 2. The screw 26 is at one end provided with a projecting flange 27, Figures 1 to 3 and 6, wherein are fastened a number of (according to the drawing four) axial pins 28 movable in longitudinal direction in holes 29 in a locking disc 30, which by means of splines 31 is arranged on the sleeve 2 in such a way that it can neither rotate nor slide in relation to the sleeve. Each of the holes 29 enlarges into a large depression 32. The pins 28, each of which is provided with a head or a shoulder, are acted upon each by its cylindrical helical spring 33, situated inside the depression 32. The locking disc 30 is provided with a groove 34 around its circumference engaged by an eccentric locking member 35 swingable on the machine frame, the said eccentric locking member 35 allowing the locking disc to rotate in one direction (in the direction of the arrow, Figure 5) but preventing the movement of said disc in the opposite direction. In the flange 27 one end of a cylindrical helical spring 36, Figures 1 to 3 and 6, is fastened, the other end being secured to the nut 25 provided with a projection or shoulder 37, with which a movable rod 38 can cooperate, in order to stop the rotation of the nut 25, when the clutch coupling is to be disconnected.

According to Figure 1 where the clutch coupling is shown thrown in, the coupling half 8 rotates together with the sleeve 2, the locking disc 30, the screw 26 (through the pins 28) and as a result of the spring connection 36, also the nut 25 in the direction of the arrow, Figures 4 to 6. The flange 27 on the screw 26 rests against one side of the locking disc 30. The outer drum 11 is coupled with and decoupled from the inner drum 10 on the rotating sleeve 2 in the manner described before, and the ramming head rises and falls thus in the usual order. If one now wants to decouple the motor, the rod 38 is moved in such a way that it cooperates with the shoulder 34 on the nut 25, so that the rotation of said nut is stopped. As the locking disc 30 and the screw 26 continue rotating, the nut 25 is caused, when prevented from rotation, to be moved to the left in Figures 1 to 3 along the screw 26, which is left threaded, and takes with it thereby the coupling half 8. On account of the relative movement, which thus takes place between the screw 26 and the nut 25, the spring 36 is tensioned. At the same time as the nut 25 is moving to the left, the screw 26 is moved to the right, so that a certain space is formed between the flange 27 and the locking disc 30. When the screw 26 is moving to the right, the pins 28 are also moved, and compress thereby the springs 33, Fig. 2. When the nut 25 together with the coupling half 8 has been moved so far to the left that the shoulders 6 have come out of engagement with the shoulders 7, the compressed springs 33, at the same moment as the engagement between the shoulders ceases, cause the screw 26, the nut 25 and the coupling half 8 to move for a distance to the left, so that space is formed between the shoulders on the coupling half 8 on one side and the shoulders on the toothed wheel 3 on the other side, see Figure 3. The flange 27 on the screw now rests anew against the locking disc 30.

The parts of the machine are so adjusted in relation to each other, that the shoulder 37 hits the rod 38 during the raising period of the ramming head. As soon as the clutch coupling is disengaged, the locking disc 30 therefore begins to rotate in the opposite direction under the action of the ramming head suspended in the drum 11, as the drum 11 during the raising period of the ramming head is coupled together with the sleeve 2 whereon the locking disc 30 is jammed. However, such a movement of the locking disc 30 is immediately prevented by the eccentric locking member 35. The ramming head remains thus locked in suspended position and the motor, which is decoupled, runs without load.

When one wants to make a single stroke with the ramming head, the rod 38 is pulled out of engagement with the shoulder 37 and then is immediately moved again into contact position for the same. When the rod is pulled out of engagement with the shoulder, the tensioned spring 36 causes the nut 25 to be screwed to the right in Figures 1 to 3, thereby moving the coupling half 8 into engagement with the shoulders on the toothed wheel 3, so that coupling takes place. The sleeve 2 is thereby caused to rotate, whereby the drum 11, which is still coupled to the sleeve 2 by means of the coupling hook 18, is rotated in such a way, that the ramming head is raised in full ramming position and thereafter, when the drum 11 is decoupled from the sleeve 2, freely falls down. During this time the shoulder 37 has been able to strike the rod 38, so that the coupling is again disconnected in the manner just described.

The device may evidently be modified in many respects within the scope of the invention.

Having now particularly described and ascertained the nature of my invention, I declare that what I claim is:

1. In a machine for controlling the reciprocating movement of a ramming head operated from a continuously driving member, the combination of a driven member and a clutch for coupling and uncoupling the driven member and source of power, a pulley intermittently rotated on said driven member to lift and lower the ramming head, a pivoted member carried by the driven member and adapted to engage the pulley to rotate the same, means disposed in the path of movement of the pivoted member to rotate the latter into and out of engagement with the pulley, and means for engaging the driven portion of the clutch to interrupt movement of the driven member and pulley without interfering with continued rotary motion of the source of power.

2. In a ramming machine, a driving member and a driven member, an automatic ram lifting and releasing device for the driven member, and a clutch coupling for the two members, comprising a fixed and an axially movable unit, screw means turning with the driven member, a coupling normally turning with the screw means and capable of movement axially thereof and engaging the movable unit of the clutch to move the same into and out of engagement with the fixed unit and thereafter interlocking with the screw, and a stop movable into engagement with the coupling to arrest rotary movement thereof.

3. In a ramming machine, a driving member and a driven member, an automatic ram lifting and releasing device for the driven member, and a clutch coupling for the two members, comprising a fixed and an axially movable unit, screw means on the driven member having rotary and axial movement therewith, a coupling intermediate the movable unit and screw means and operatively associated with each, means for arresting rotary movement of the movable unit, a block turning with the driven member to prevent rotation thereof in the opposite direction, and a connection yieldable axially of the driven member between the block and the screw means.

4. In a ramming machine, a driving member and a driven member, an automatic ram lifting and releasing device for the driven member, and a clutch coupling for the two members, comprising a fixed and an axially movable unit, a flanged sleeve loose on the driven member, the sleeve portion being externally threaded, a coupling member internally threaded at one end to engage the threads of the sleeve and flanged at the other to loosely embrace the movable unit, a stop arranged on the coupling, means manually operated to be brought into the path of the stop to arrest rotary movement of the coupling, a block fixed on the driven member, yieldable connections between the block and flange of the sleeve and means associated with the block to permit rotary movement thereof in one direction only.

5. In a ramming machine, a driving member and a tubular driven member, a shaft projecting through the bore of the driven member and having a cam arrangement at one end thereof, a drum integral with the end of the driven member adjacent the cams, a dog pivotally mounted in the drum and contacting with the cams, a winding and an unwinding drum embracing the first drum and having a lug to be engaged by the dog to rotate the second drum with the first until one of the cams releases the dog from engagement with the lug, and a clutch coupling for the driving and driven members, comprising a block keyed to the driven member, means associated with the block to permit rotation of the driven member in a winding direction for the first drum, a screw loose on the driven member, a yieldable connection between the block and screw whereby the latter is capable of operating axially and in a rotary direction with the driven member, a coupling movable over the screw by relative movement thereof with respect to the coupling, a stop for interrupting rotary movement of the coupling, a movable unit of the clutch arranged on the driven member and engaged by the coupling to operate the unit from the axial movement of the coupling and screw, and a fixed unit of the clutch integral with the driving member to be engaged and disengaged by the movable unit.

6. A ramming machine as claimed in claim 5, including means for rotary adjustment of the shaft and cams to regulate the fall of a ram by the point at which the said dog disengages the lug and releases the winding drum.

7. A ramming machine, as claimed in claim 3, including a flexible yieldable connection between the screw means and coupling for returning the latter to permit engagement of the clutch.

In witness whereof, I have hereunto signed my name.

ERNST HJALMAR CARLSSON.